US010782104B2

(12) United States Patent
Gaynor et al.

(10) Patent No.: US 10,782,104 B2
(45) Date of Patent: *Sep. 22, 2020

(54) BLOCKING PAD AND A METHOD OF USE THEREOF

(71) Applicant: Grafton School, Inc.

(72) Inventors: James Gaynor, Winchester, VA (US); Kim Sanders, Charles Town, WV (US); Christopher S. Feltner, Strasburg, VA (US)

(73) Assignee: GRAFTON SCHOOL, INC., Winchester, VA (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/027,045

(22) Filed: Jul. 3, 2018

(65) Prior Publication Data

US 2018/0313637 A1 Nov. 1, 2018

Related U.S. Application Data

(63) Continuation of application No. 13/720,492, filed on Dec. 19, 2012, now Pat. No. 10,145,656.

(51) Int. Cl.
*F41H 5/08* (2006.01)
*A63B 69/00* (2006.01)
*A63B 71/08* (2006.01)

(52) U.S. Cl.
CPC .............. *F41H 5/08* (2013.01); *A63B 69/00* (2013.01); *A63B 69/004* (2013.01); *A63B 71/08* (2013.01)

(58) Field of Classification Search
CPC ....... A63B 69/00; A63B 69/004; A63B 71/08; F41H 5/08
See application file for complete search history.

(56) References Cited

U.S. PATENT DOCUMENTS

| 2,574,046 | A |   | 11/1951 | Logan |
| 3,396,969 | A |   | 8/1968  | Martin |
| 4,546,966 | A |   | 10/1985 | Segura |
| 4,667,954 | A | * | 5/1987  | McCorkle ............. A63B 69/26 473/444 |
| 4,732,378 | A |   | 3/1988  | LeFebvre et al. |

(Continued)

FOREIGN PATENT DOCUMENTS

| WO | 1996032167 A1 | 10/1996 |
| WO | 2009131727 A9 | 12/2009 |
| WO | 2014099766 A1 | 6/2014 |

OTHER PUBLICATIONS

"International Application No. PCT/US2013/075366 International Search Report and Written Opinion", dated Apr. 23, 2014, 9 pages.

(Continued)

*Primary Examiner* — Megan Anderson
(74) *Attorney, Agent, or Firm* — Goodhue, Coleman & Owens, P.C.

(57) ABSTRACT

A system, method, and blocking pad for receiving strikes from a special individual. The blocking pad includes a pad configured to receive the blows from the special individual. The blocking pad further includes a number of handles connected to a back of the pad. The number of handles include at least two handles in a middle portion of the back of the pad and at least a handle at ends of the pad.

18 Claims, 4 Drawing Sheets

(56) References Cited

U.S. PATENT DOCUMENTS

| | | | |
|---|---|---|---|
| 5,232,368 A * | 8/1993 | Morgia | A63B 69/20 |
| | | | 273/DIG. 30 |
| 5,329,636 A | 7/1994 | Siddle | |
| 5,377,577 A * | 1/1995 | Bounkong | F41H 5/08 |
| | | | 2/2.5 |
| 6,668,401 B2 * | 12/2003 | Waters | A47C 21/00 |
| | | | 5/504.1 |
| 6,807,890 B1 * | 10/2004 | Fuqua | F41H 5/08 |
| | | | 89/36.02 |
| 7,056,238 B1 | 6/2006 | Brown | |
| 7,306,464 B2 | 12/2007 | Long et al. | |
| 2012/0165138 A1 | 6/2012 | Smith | |
| 2012/0180636 A1 | 7/2012 | Seuk | |
| 2014/0024503 A1 * | 1/2014 | Chiang | A63B 69/004 |
| | | | 482/83 |

OTHER PUBLICATIONS

Calkins, "Using Color as a Therapeutic Tool", Ideas Istitue, 2010 Retrieved from the internet: entire document, 2010, 8 pages.

* cited by examiner

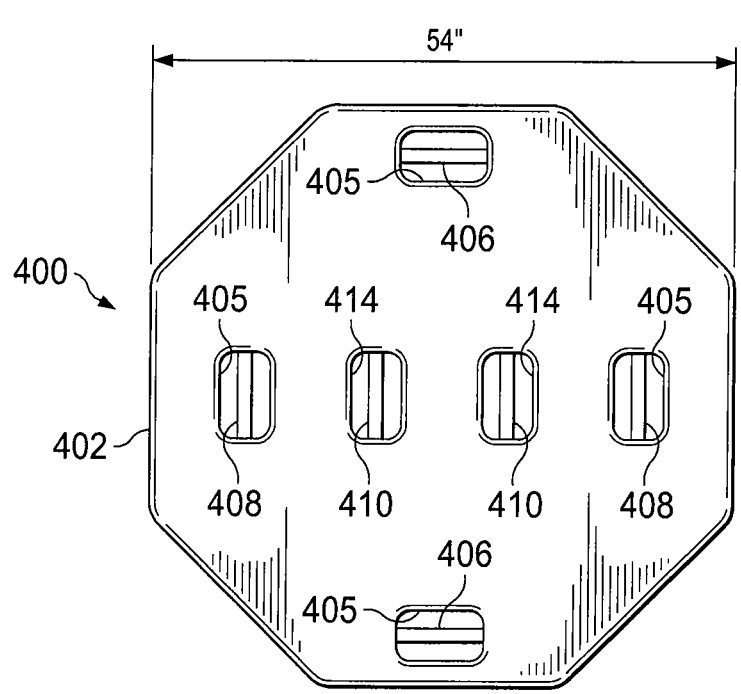
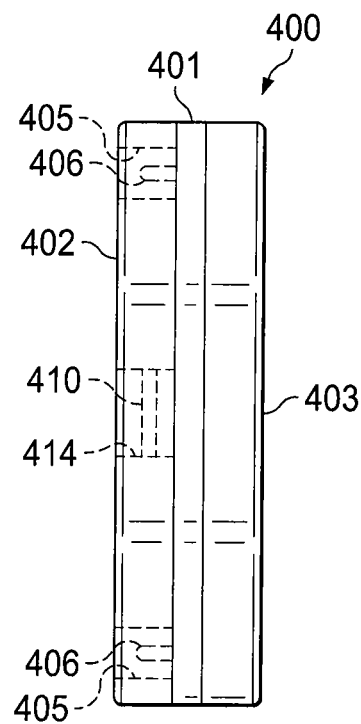
FIG. 4  FIG. 5
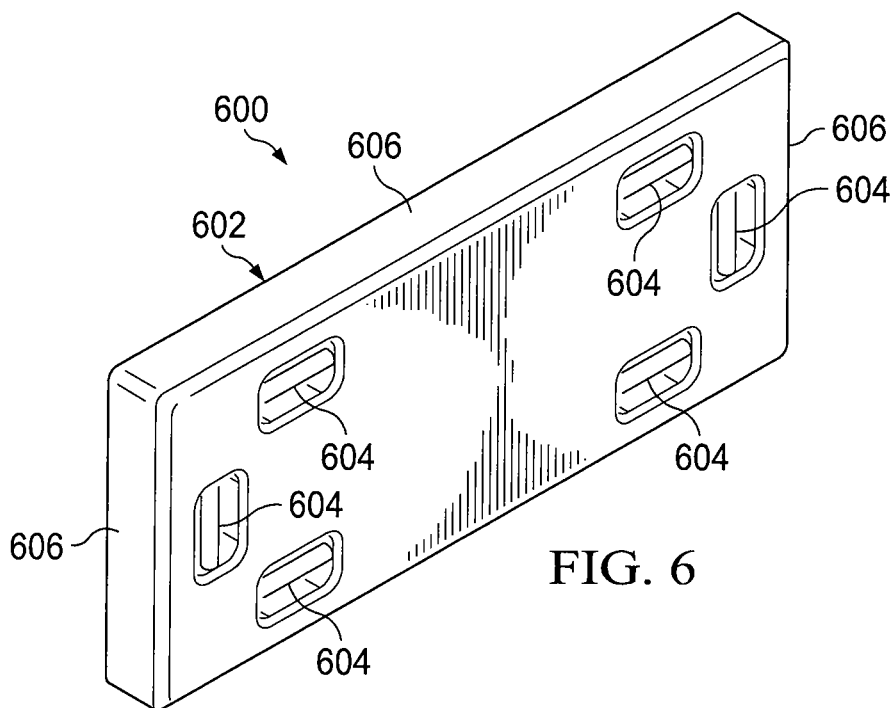
FIG. 6

BLOCKING PAD AND A METHOD OF USE THEREOF

BACKGROUND

The ability of organizations, hospitals, schools, businesses, individuals, and others to recognize and treat individuals with disabilities and significant emotional or behavioral challenges has improved drastically in recent years. For example, more individuals with physical disabilities, autism, chemical imbalances, mental disorders, behavioral problems, drug addictions, and other conditions are being treated each year. Improved medications, training, treatment processes, education, and information have provided solutions for addressing the needs of individuals with special needs.

However, equipment and processes for addressing individuals that are aggressive towards others have not improved significantly. For example, some individuals may become aggressive randomly, occasionally, or consistently by hitting, kicking, grabbing, running into, pulling hair, throwing things, or otherwise hurting or attempting to ensure others, property, or themselves. In many cases, despite available advances, medical professionals, teachers, and staff that work with special individuals may struggle to protect themselves as well as the special individual from injury or other harms.

SUMMARY

One embodiment provides a system, method, and blocking pad for receiving strikes from a special individual. The blocking pad may include a pad configured to receive the blows from the special individual. The blocking pad may further include a number of handles connected to a back of the pad. The number of handles may include at least two handles in a middle portion of the back of the pad and at least a handle at ends of the pad.

Another embodiment provides a blocking pad for preventing injury to a special individual. The blocking pad may include a pad configured to receive impact from strikes by the special individual. The blocking pad may include a number of handles defined within the pad. The handles may be positioned about a periphery of the pad.

Yet another embodiment includes a method for utilizing a blocking pad. A blocking pad may be retrieved by a user and includes at least four handles. The blocking pad may be positioned to receive strikes from a special individual. The user may receive strikes from the special individual to prevent injuries to the user and to the special individual.

BRIEF DESCRIPTION OF THE DRAWINGS

Illustrative embodiments of the present invention are described in detail below with reference to the attached drawing figures, which are incorporated by reference herein and wherein:

FIG. 4 Is a rear view of another blocking pad m accordance with an illustrative embodiment;

FIG. 5 is a side view of the blocking pad of FIG. 4 in accordance with an illustrative embodiment;

FIG. 6 is a front view of another blocking pad in accordance with an illustrative embodiment;

DETAILED DESCRIPTION OF THE DRAWINGS

Figure 1:
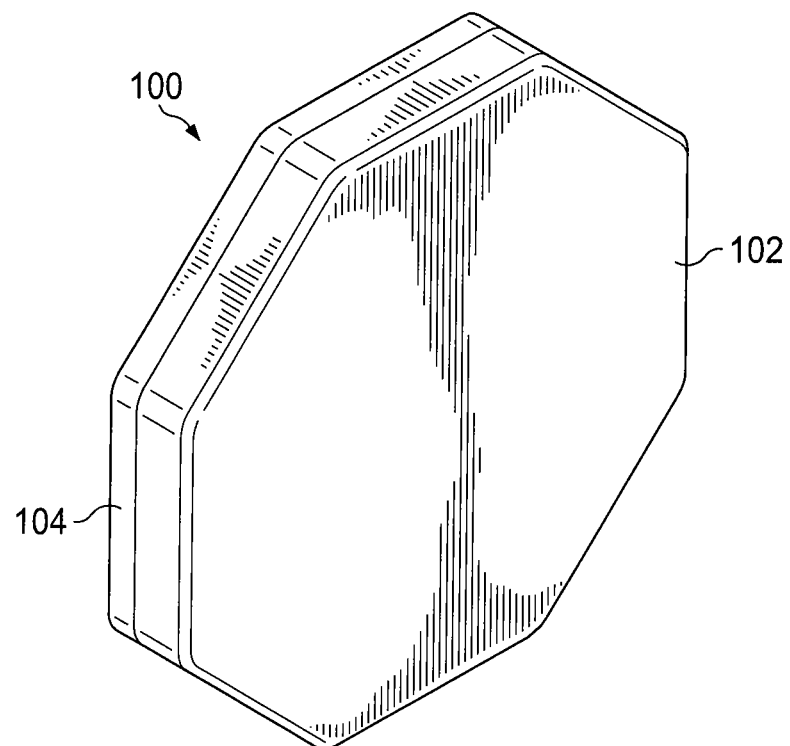
FIG. 1 is a pictorial representation of a blocking pad in accordance with an illustrative embodiment.

The illustrative embodiments provide a blocking pad and method of utilizing the blocking pad to prevent individuals with special needs from hurting others or themselves. For purposes of simplicity the user holding or utilizing the blocking pad (e.g. caregiver, teacher, public official, medical professional, professional staff, etc.) is referred to herein as the user and the individual attempting to hurt others or him or herself (e.g. client, student, individual with special needs, disabled person, prisoner, etc.) is referred to as the Special Individual (S.I.). The user or S.I. may be male or female, and as a result, various terms, such as he, she, him, her, himself, herself, and so forth are utilized interchangeably.

The blocking pad may have any number of configurations of padding, support structures, and handles. The blocking pad may be used while the user is standing, in a defensive position (e.g. against a wall, in a corner, lying down, etc.), or in any number of perpendicular, horizontal, or angled positions. For example, the blocking pad may include any number of handles for utilizing the blocking pad in distinct positions that may be most convenient or necessary for the user. For example, the blocking pad may be utilized to protect the limbs, head, neck, lower extremities, torso, and upper body of the user.

Embodiments are directed to providing an aggression blocking method, through the use of a physical system and equipment (blocking pad) used to safely and effectively arrest and treat the aggressive behaviors without the use of restraints of any kind. Users of the described embodiments may maintain safe, quality care as well as dignified treatment methods that preserve the dialogue between aggressor and the caregiver. The humane and care centric method provides a progressive set of treatment tactics aimed at curtailing the aggressive and self injuring behavior and honors the patients', students', prisoners' individual rights and is focused on helping the individual overcome the aggression episode whether directed at themselves or others.

The illustrative embodiments may be utilized to eliminate accidental death, severe injury, and caregiver liabilities and physical harm resulting from the aggression of those afflicted with disorders or illness. The embodiments may completely eliminate or significantly reduce the physical, mental, and deadly harm that accompanies the use of restraints. In one embodiment, the method includes specially designed equipment used to protect the user or caregiver by providing padded blocking pad.

In another embodiment, the blocking pad, an electronic audio or visual system, media system, personal electronic devices (e.g. cell phone, headset, mp3 player, etc.) may communicate instructions to a user for utilizing the blocking pad and facing the situation or problem. In one embodiment, the instructions, commands, or feedback may be played automatically in response to a user request, an alarm being activated, or a user selection. The instructions may also be communicated to the user in response to selections by another user from a computing or communications device managing or communicating with another electronic device, such as a wireless device, media display system, public announcement system, speaker system or so forth.

The blocking pad may also written instructions for the user to address the situation as are herein described. In one embodiment, the instructions are printed, written, or attached to the blocking pad allowing for occasional updates or replacements. The blocking pad may also include a pocket for an electronic device or a display on the back side for playing soothing music, giving instructions to the user or S.I., or providing other feed back.

Figure 2:
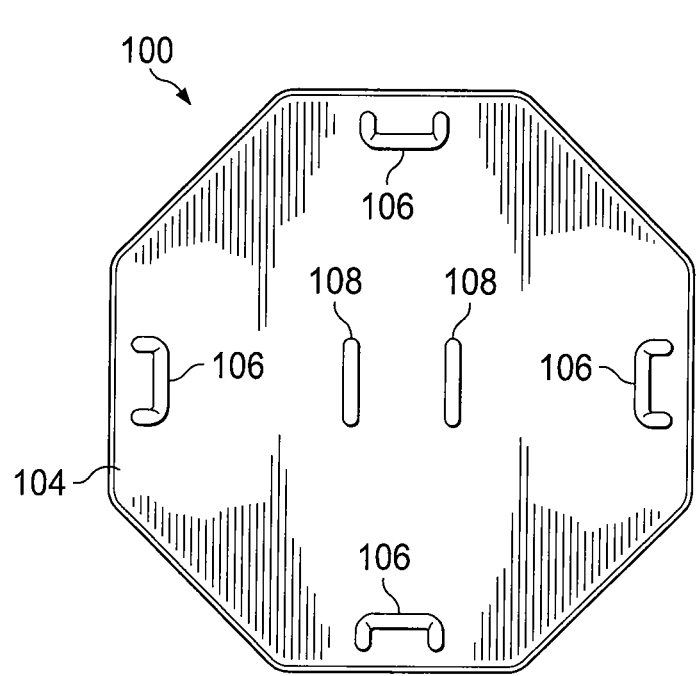
FIG. 2 is a rear view of the blocking pad of FIG. 1 in accordance with an illustrative embodiment.
Figure 3:
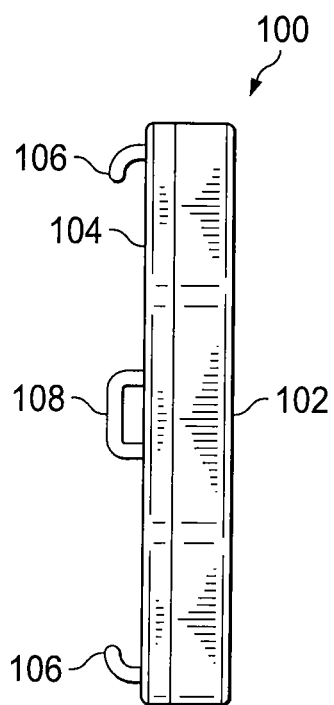
FIG. 3 is a side view of the blocking pad of FIG. 1 in accordance with an illustrative embodiment.

Turning now to FIGS. 1-3 showing pictorial representations of a blocking pad 100 in accordance with an illustrative embodiment. The blocking pad 100 is one embodiment of a blocking pad utilized to protect the user, the S.I., and others. In one embodiment, the blocking pad 100 may include a pad 102, a support 104, exterior handles 106, and interior handles 108.

In one embodiment, the blocking pad 100 is octagonally shaped. The octagonal shape may be useful for preventing the blocking pad 100 from a rolling when rested against a wall or other location. In addition, the octagonal shape and angles of the blocking pad make it easier for the user to see over the blocking pad 100 while still being effectively utilized for self-protection. The size and shape of the blocking pad 100 also allows the user to be protected behind the blocking pad 100 if backed into a corner. The blocking pad 100 may be produced and available in a facility or organization in a number of different shapes, widths, lengths, and thicknesses to match the level and type of aggression of the S.I.

In other embodiments, the blocking pad 100 may be circular, rectangular, square, triangular, pentagonal, polygonal, oval, or so forth. The blocking pad 100 may utilize any number of symmetric or asymmetric shapes. In one embodiment, the blocking pad 100 is approximately 54" long and 54" wide. The blocking pad 100 may include a strap, Velcro, or other attachment point or mechanism for storing or hanging the blocking pad 100 until needed.

In one embodiment, the blocking pad 100 may have a flat exterior shape. In another embodiment, the blocking pad 100 may be inwardly concave toward a center point of the blocking pad 100. The inwardly concave shape of the blocking pad 100 may allow the pad 102 and the support 104 to flex about the periphery in response to blows, strikes, or other pressure from the S.I. In another embodiment, the blocking pad 100 is convexly shaped. The outwardly convex shape of the blocking pad 100 may help deflect blows away from the user shielded by the blocking pad 100. In addition, the blocking pad 100 may include more padding or cushion in the center of the blocking pad 100 where strikes are most likely to land.

The padding of the blocking pad 100 may be sturdy and soft without being overly heavy. For example, the padding of the blocking pad 100 may be impact absorbing foam, memory foam, C3 foam, PET foam, Corecell™ A, or P-foam, IMPAX®, or so forth. In one embodiment, the blocking pad 100 may include multiple internal layers and coverings for providing enhanced shock absorption, protection, and longevity for the blocking pad 100. For example, a stiffer base layer, may be adhered our attached to a medium density foam, and then a lighter impact foam may be covered to provide a striking surface.

In one embodiment, the exterior portion of the blocking pad 100 is covered in vinyl or other similar materials. Vinyl is easily cleaned and disinfected for repeated use. Blue or green colors are preferable for their known soothing characteristics and influence. In one embodiment, the blocking pad 100 may include a cover or alternative surfaces. For example, fur, faux fur, burlap, velvet, silk, or other materials may be utilized that appeal to those with sensory issues. Various patterns may also be utilized to calm, and/or intrigue the S.I.

The pad 102 may be permanently or temporarily connected to or integrated with the support 104. In one embodiment, the support 104 provides a base plate for the blocking pad 100. The support 104 also provides the structure that supports the pad 102 during utilization. The support 104 may be solid or my include cavities for reducing the weight of the blocking pad 100. For example, the support 104 may have a honeycomb structure. The support 104 may be formed of plastic, rubber, metal, composites, polymers, carbon fiber, or other combinations of materials. In one embodiment, the support 104 is dense foam integrated with the pad 102.

In one embodiment, the pad 102 is adhered to the support 104. In another embodiment, the pad 102 and the support 104 may be temporarily connected utilizing Velcro, straps, buttons, clasps, or other attachment mechanisms. As a result, the pad 102 may be connected or removed to be replaced with thicker, denser, lighter, or thinner pads that may be more appropriate for specific circumstances or S.I.s. For example, a more petite user might require a lighter pad enabled to fully utilize the blocking pad 100. Likewise, another user might require a larger thicker pad for helping S.I.s of a larger size and strength.

In one embodiment, the edges of the pad 102 and the support 104 are rounded to prevent injury to the S.I. or the user during utilization of the blocking pad 100. For example, even if the pad 102 and support 104 are octagonal, the various edges may be rounded to prevent cuts, abrasions, punctures, or stabbing during utilization.

In one embodiment, the pad 102 and the support 104 may be integrated. For example, the pad 102 may include a more rigid portion integrated within the pad 102 that provide support for the blocking pad 100. In another embodiment, the pad 102 may be rigid enough that the support 104 is not needed.

The pad 102 or support 104 may include a number of handles including the exterior handles 106 and the interior handles 108 (jointly the "handles 109"). The handles 109 may be positioned to allow the user to hold and utilize the blocking pad 100 in any number of positions. The interior handles 108 may allow the user to utilize the blocking pad 100 to protect himself from the S.I. In one embodiment, the interior handles 108 may be utilized as a sleeve to put the hand and arm through to hold and support the blocking pad 100 with the lower arm or forearm. For example, the interior handles 108 may be replaced by a sleeve allowing such user interaction. The exterior handles 106 may be utilized to supplement the handholds of the user. For example, the user may be required to utilize the blocking pad 100 in open areas, bathrooms, closets, under tables, or in any number of positions in which different handholds may be required for the protection of the user and S.I.

The exterior handles 106 may also be utilized to provide even more stability during large strikes or blows against the blocking pad 100 or user. As shown, the blocking pad 100 may be utilized with the interior handles 108 aligned vertically. However, the blocking pad 100 may be turned in any number of angles including with the interior handles 108 aligned horizontally. In addition, the blocking pad 100 may be utilized and positioned in an infinite number of ways as may be required and complex three-dimensional spaces based on the situation facing the user. The exterior handles 106 may be useful for positioning the blocking pad 100 to prevent strikes directed at the user's head or upper extremities or legs or lower extremities. In one embodiment, the handles 109 may be positioned at the sides and ends of the blocking pad 100 as shown. In another embodiment, the interior handles 108 may be further spaced apart to be considered side handles or handles at the side of the pad 102 (see FIG. 8).

The handles 109 may utilize any number of shapes and sizes. In one embodiment, the gripping portion of the handle may be cylindrical. In another embodiment, the grip of the handle may be more oval-shaped or may include groups or other economic features. The size and shape of the handles 109 may also be selected when connected to the support 104 during manufacturing or during custom configuration. For example, the handles 109 may include adjustable nylon or nylon straps for adjusting the extension of the handles 109 with a rubber coated nylon handle. The handles 109 may also be covered with a clear flexible plastic tube for added stability. In one embodiment, the core of the handles 109 gripped by the user may be formed from plastic, rubber, or so forth.

As shown in FIGS. 2 and 3, the handles 109 extend from the support 104. In one embodiment, the handles 109 may be formed of straps, rope, plastic, padded handgrips, or so forth. The handles 109 may be fixed or may be flexible or movable. In one embodiment, the handles 109 may be a combination of fixed and flexible handles for supporting the various circumstances and conditions based by the user. In another embodiment, the support 104 may include a number of ports or attachment points for attaching the handles 109 in a custom configuration that may best fit the size and needs of the user. In yet another embodiment, the handles 109 may have a single attachment point and may be configured to pivot about the attachment point with the support 104.

Turning now to FIGS. 4 & 5 showing another blocking pad 400 in accordance with an illustrative embodiment. In one embodiment, the blocking pad 400 may include a support 401, pads 402 and 403, openings 404 and 405, exterior handles 406, exterior handles 408, and interior handles 410.

The blocking pad 400 may differ in that the exterior handles 406 and 408 and the interior handles 410 (jointly the "handles 411") do not extend beyond the plane of the blocking pad 400. Instead, the handles 411 are reached through the various openings 404 and 405. One or more of the pads 402 and 403 define the openings 404 and 405 which are cavities better utilized to access the handles 411. For example, the openings 404 and 405 may define holes in the pad 402 and minor cavities in the pad 403 adjacent the handles 411. As a result, the user may be able to entirely grasp the handles 411. The openings 404 and 405 may utilize any number of sizes and shapes. For example, the openings 404 and 405 may be rectangular, oval, circular, rounded, or any combination thereof. The openings 404 and 405 may be sized to receive a hand of the user. In one example, the openings 404 and 405 may be large enough that the user may seize our grasp the handles 411 without touching the patent 402. In another example, the openings 404 and 405 may be sized such that there is an interference fit with the user's hands when holding the handles 411. In other words, the size and shape of the openings may help the user better retain hold of the handles 411 during utilization.

In one embodiment, the handles 411 are defined by the support 401. The handles 411 may extend perpendicularly from the plane of the support 401 allowing the user to better grasp the handles 411. For example, the handles 411 may have a curved shape that extends in the direction of the pad 402.

In another embodiment, the handles 411 may be defined entirely within the plane of the support 401. In such an embodiment, the pad 403 include minor cavities (not shown) allowing the user to position fingers, palm, or other portions of the hand around the handles 411.

Turning now to FIG. 6 showing a front view of another blocking pad in accordance with an illustrative embodiment. The blocking pad 600 provides an alternative embodiment that may be utilized to prevent self-harm, perform blocking, or otherwise provide self-protection. In one embodiment, the blocking pad includes a pad 602 and handles 604.

The pad 602 may be thinner and may be particularly useful for prevent self-harm to a S.I. In one embodiment, the pad 602 is formed from a closed cell foam rubber covered in vinyl, a nylon neoprene, or an EVA foam. For example, a S.I. may be banging his head into a wall and the user may position the blocking pad between the wall and the S.I. to prevent or reduce the potential for injury or self-harm. The blocking pad 600 may be moved into position quickly. In one embodiment, the blocking pad is 36" wide by 15" wide. However, any number of sizes and shapes may be utilized.

The pad 602 may define the handles 604 that are positioned for versatility. The handles 604 are slits or cut-outs that extend through the pad 602. In one embodiment, the pad 602 defines six handles 604. In one embodiment, the handles 604 are wave shaped. However, the handles 604 may be ovals, rectangles, or other ergonomic shapes. The handles 604 may be positioned close to an edge of the pad 602 so that the user may utilize the edge 606 of the pad 602 as part of the gripping surface. For example, the user may place his fingers through the handles 604 when utilizing the blocking pad. In one embodiment, the handles 604 may include inserts (not shown) so that the unused handles 604 may be filled. The pad 602 and the handles 604 allow the pad 602 to be quickly utilized to cushion a hard surface that a S.I. is striking to prevent the individual from harming his head, face, hands, feet or sensitive areas of the body.

Figure 7:
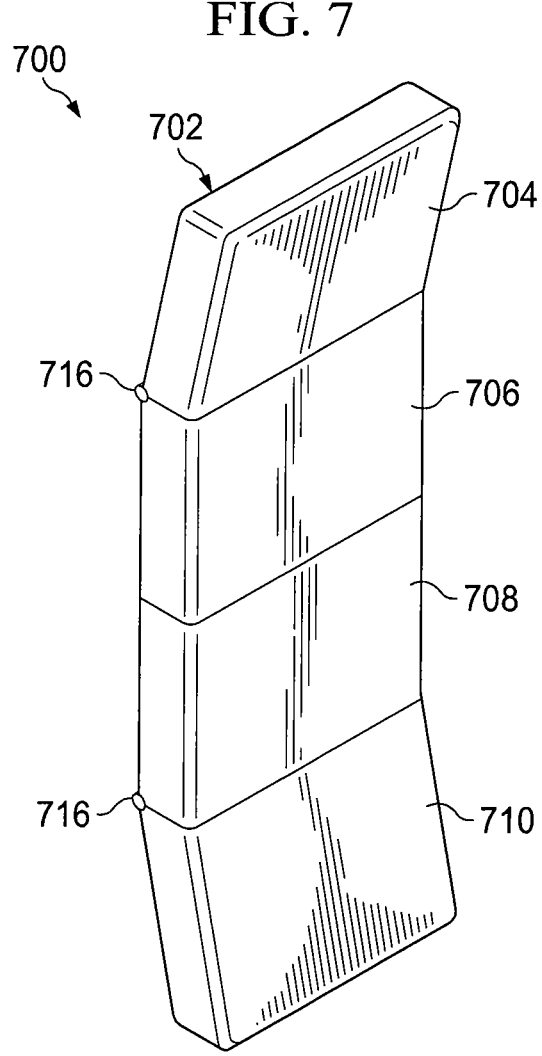
FIG. 7 is a pictorial representation of another blocking pad in accordance with an illustrative embodiment.
Figure 8:
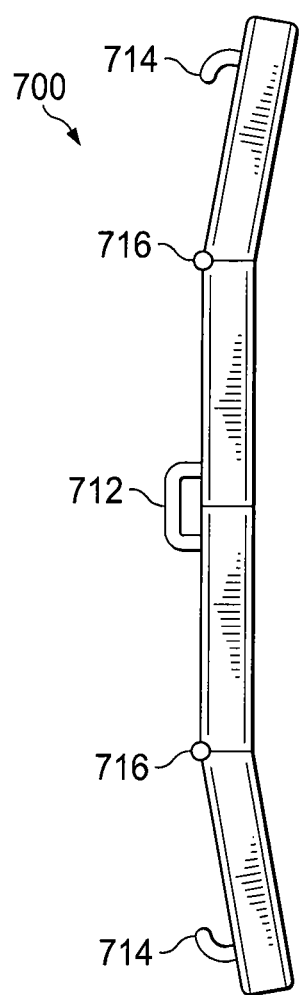
FIG. 8 is a side view of the blocking pad of FIG. 7 in accordance with an illustrative embodiment.

Turning now to FIGS. 7 and 8 illustrating pictorial representations of another blocking pad 700 in accordance with an illustrative embodiment. In one embodiment, the blocking pad 700 may include pad 702 composed of segments 704, 706, 708, and 710, handles 712, handles 714, and hinges 716.

In one embodiment, the segments 704-710 make up the pad 702 of the blocking pad 700. The segments 704-710 may be fixedly attached to one another. For example, a support may attach the segments 704-710 in a slightly concave curve.

In another embodiment, the segments 704-710 may be hingedly attached to one another by hinges 716. In one embodiment, the hinges 716 are configured to open a maximum amount as shown in FIG. 8. In another embodiment, the hinges 716 may be spring-loaded to absorb shocks to the segments 704-710. For example, the hinges 716 may allow the segments 704-710 to have some flexibility and give to further prevent injuries or harm. In one embodiment, the hinges 716 may latch into place when opened or closed and may include a release mechanism for allowing the hinges 716 to pivot.

The hinges 716 may also allow segment 702 fold in on segment 706 and a segment 710 two fold in on segment 708.

In one embodiment, the ends of the segments 704 and 710 may include straps and a buckle, Velcro, snaps, buttons, or other components for being secured to one another or to another portion of the blocking pad 700, such as segments 706 and 708. For example, the ends of the segments 704 and 710 may include Velcro for attaching to one another when folded in. As a result, the blocking pad 700 may be utilized in an expanded configuration that provides increased surface area and thinner padding or a contracted configuration that is has a smaller surface area and thicker padding.

The segments 704-710 may also be folded up to store protective materials, such as helmets, arm guards, gloves, knee guards or so forth. The blocking pad 700 may be folded up in a reduced footprint in order to be stored in a location or easily transported for emergency situations.

In one embodiment, the segments 704-710 may be reversible, removable, or replaceable with the exterior surface of each side having a different texture. For example, different textures and types of materials may be more effective in different facilities or conditions as previously described.

In one embodiment, the handles 712 and 714 may allow the user to hold and manipulate the blocking pad 700 during utilization. In another embodiment, the handles 712 may be utilized as a sleeve or other attachment to the user's forearm. As a result, the blocking pad 700 may be utilized in a shield configuration that is secured to the forearm of the user providing for mobility, strength, and enhanced protection.

In one embodiment, the blocking pads of the various embodiments utilized solid colors, such as blue or green known for their calming affects. In other embodiments, the blocking pads may include logos or patterns for focusing potential blows on a specific area to best protect the user and S.I.s during utilization. For example, the blocking pad may include red circles for the most cushioned areas drawing the attention and potential blows from the S.I. The blocking pad may also include a picture, shapes, or colors that are meant to direct blows to those areas of the blocking pads.

The blocking pads and methods of utilization as are herein described may be utilized to manage emergency safety situations without utilizing restraint or seclusion. The blocking pad may be utilized to minimize restraint and seclusion, protect users, other individuals, and the S.I. who may engage in dangerous or self injurious behavior. The blocking pad may be utilized with other teaching principles to teach the S.I. skills necessary for success and social integration. During a situation, problem, or crisis the blocking pad may be utilized to end the crisis without anyone getting hurt. In many cases aggression may result from severe conditions or disabilities, long-term treatments, or individuals that are treatment resistant.

In many cases, the origin of aggression isn't necessarily deliberate or personally directed. Instead, aggression may be a fight or flight response to pain or fear (e.g. physical, psychiatrics, etc.) by using the blocking pad, the user may be challenged to address the problem without experiencing their own form of pain or fear. The user may focus on addressing fear in order to increase safety for everyone in a facility, organization, or environment. The S.I. may be helped by meeting her needs including self-fulfillment needs, psychological needs, and basic needs. Self-fulfillment needs may include the S.I.s self-actualization to achieve his or her full potential including creative activities. Psychological needs may include esteem needs including prestige and feelings of accomplishment and belonging and love including intimate relationships and friends. Basic needs may include safety and security as well as physiological needs including food, water, warmth, and rest.

Figure 9:
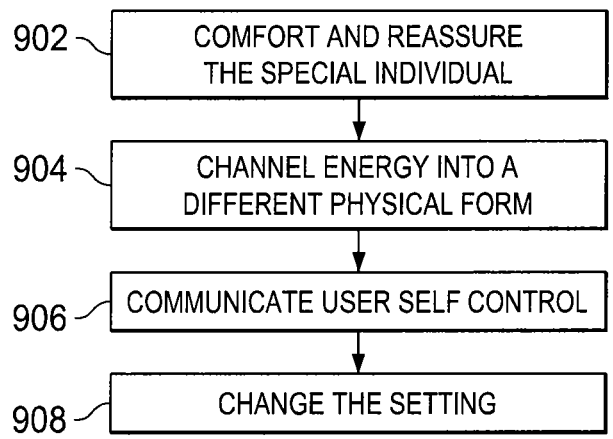
FIG. 9 is a flowchart of a process for assisting a special individual in accordance with an illustrative embodiment.

Turning now to FIG. 9, illustrating a flowchart of a process for assisting a S.I. in accordance with an illustrative embodiment. The steps and processes described in FIG. 9 may be utilized in any order including sequentially, simultaneously, and concurrently, and are only shown as a flowchart for purposes of simplicity. In one embodiment, a computing, display, or communications device may be configured to display information and reminders to the user in real time. For example, a mobile or computing application may be configured to help the user address the situation. The information may be displayed in response to requests from the user, voice or sound recognition, feedback or signals from other systems (e.g. security video, manual selections from a third-party user, etc). For example, televisions within a room may automatically prompt the user to say certain things as are included below. In another example, a personal communications device, such as a cell phone may display or audibly communicate suggestions or feedback to the user. In another embodiment, a print out or electronic information may be displayed on the back of the blocking pad to further facilitate the user.

In one embodiment, the user may focus on comforting and reassuring the S.I. (step 902) rather than controlling or reprimanding the S.I. In many cases, the user may notice a S.I. who seems to be agitated or distressed and may try to reassure or comfort the S.I. rather than providing a reprimand or giving a directive. The user may intervene early with comfort, choices, and alternative strategies. For example, the user may utilize statements, such as "You'll be okay", "It is safe here", "I understand", "Tell me how to help", "Tell me what to do", "I'm right here", "No one will hurt you", "Are you hurt?", "Are you hungry?", "Are you thirsty?", "Are you afraid?", "I'm here to help", "You are not in trouble", and "It looks at you feel awful."

The user may also encourage the S.I. to channel energy into a different physical response (step 904). For example, aggressive behaviors or tics associated with Tourette syndrome may be best addressed with the user encouraging the S.I. to express himself. For example, the user may utilize the blocking pad and encourage the S.I. to "punch this", "throw this", "space here", "hit this", "let's throw this together", "shout it out", "kick this", "do it some more", "kick it harder", "kick it again", "jump again, jump, jump higher", "say it again", and "say louder." The S.I. may also be encouraged to run in place, around the room, dance, or otherwise expel their energy that may be channeled as aggression.

The user may also communicate self-control (step 906) by doing certain things. For example, the user may be flexible, caring, soft-spoken, gentle, funny, utilize the golden rule, and treat the S.I. in a respectful manner.

The user may also change the setting (step 908). For example, the user may encourage the S.I. to use her hands (e.g. stress balls), walk, rock in a rocking chair, run, swing, throw things outside, or go to another area to cool off (i.e. quiet room). The user may ask the S.I. what would help her in the moment and offer suggestions if necessary. The user may also attempt to avoid certain activities, such as communicating blame or shame and engaging in power struggles. The user may also utilize contingency management including positive reinforcement, behavior strategies and a treatment plan, "time in" for all improvements, and planned ignoring of small behavioral issues. The user may also utilize any number of behavior analysis techniques, plan treatments, program planning, building trustful relationships, de-escalation strategies, conflict resolution strategies, psychological assessment and individual therapy, medical assessment and treatment, and blocking and protection utilizing a blocking pad.

In one embodiment, the blocking pads and methods described herein may be utilized to convert or divert aggressive actions and channel them elsewhere. The illustrative embodiments may also be referred to as extraordinary blocking or Ukeru. The process may be utilized to receive, engage, sense, feel, and respond to what the S.I. is attempting to communicate through their actions while maintaining the safety of all potential participants and bystanders. The blocking pad may be utilized to protect the user from hits, kicks, punches, bites, hair pulls, and so forth. The blocking pads may be utilized in conjunction with other protective equipment, such as helmets, gloves, shin guards, neck guards, knee pads, safety goggles, ball caps, body armor, and so forth to protect oneself.

Blocking may be utilized in any number of situations, conditions, or circumstances. In one embodiment, blocking may be utilized when prevention and de-escalation efforts fail, when unexpected or uncontrollable provocation occurs, when the person is dissociated or has some other neuropsychiatric disturbance (e.g. PTSD flashback) that produces a violent response to a situation, or when a person feels the need to discharge strong emotions. Blocking is utilized as an alternative to physical restraint. Blocking may require more time per incident than physical restraint, and teamwork, individualization, and creativity, but provides the opportunity for the S.I. to utilize new skills that are learned, provides the opportunity to express or work through negative emotions or energy, and results in injuries that are less severe (e.g. bruises instead of broken bones or muscle strains).

When utilizing the blocking pad the user may attempt to increase the distance between him and the S.I., try to keep space between the blocking pad and the S.I. (i.e. the S.I. may press up against the pad but the user should not push the pad into the S.I.), maintain balance utilizing known stances, tell the S.I. why the user is utilizing the blocking pad and how the user is going to use it, use body positioning to direct a S.I.s movement, and be aware of surroundings to avoid being pinned against a wall or table and avoid tripping over in any nearby object.

When utilizing the blocking pad, the user may not attempt to do any of the following: move closer to the S.I. than is absolutely necessary, back the S.I. into a corner or wall, put the blocking pad in the S.I.'s face or attempt to restrain a body part with the blocking pad, jab a blocking pad at the S.I. to get him to back up, or be concerned about a blocking pad being damaged or destroyed (this is what it is used for). The blocking pad may be utilized to protect the upper body, lower body, and extremities of the user. The blocking pad may also be utilized to protect against self-injury of the S.I.

Figure 10:
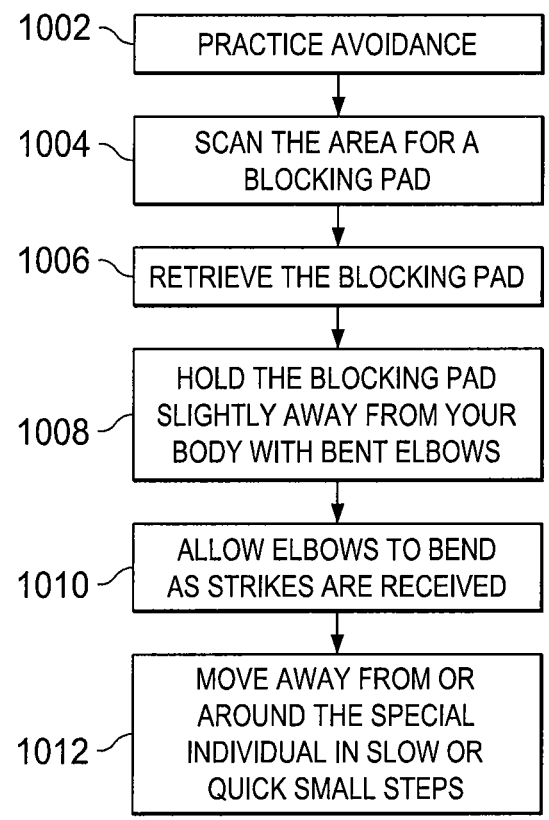
FIG. 10 is a flowchart of a process for utilizing blocking in accordance with an illustrative embodiment.

FIG. 10 is a flowchart of a process for utilizing blocking in accordance with an illustrative embodiment. The process of FIG. 10 may be implemented by a user. In another embodiment, an electronic device may provide guidance to the user or other steps for addressing the situation manually or automatically.

The process may begin with the user practicing avoidance (step 1002). Avoidance is preferred to prevent injury to the user or S.I. To avoid the S.I., the user may pivot away from the direction of a punch or strike, get into a stance position, and move further away from the S.I.

Next, the user scans the area for a blocking pad (step 1004). During step 1004 user may also look for other protective gear while maintaining the stance position. In one embodiment, an audible or visual alert may indicate the location of a blocking pad in response to a sensed disturbance, audible request, or so forth. The user may also retrieve distraction devices, gear, or equipment, such as bean bags.

The user retrieves the blocking pad (step 1006). The user may physically retrieve the blocking pad or protective gear or another user may hand or toss it to the user. When approaching the S.I. with the blocking pad, the user may carry it in a position that does not appear threatening, but with which the user may easily bring the blocking pad into position if necessary.

Next, the user holds the blocking pad slightly away from her body with bent elbows (step 1008). During step 1008, the user does not hold the blocking pad against her chest. The user allows her elbows to bend as strikes are received against the blocking pad (step 1010). The user allows her elbows to bend to absorb pressure reducing the potential that either the user or S.I. are injured. The user may position the blocking pad in front of shins and ankles to prevent injuries. The user may bend at the knees and keep the back straight and head up so that the user may watch the movement of the S.I. The user may utilize the blocking pad or a bean bag as a distraction for the S.I. to kick or pommel. For example, a spare blocking pad may be thrown in front of (towards the floor, not at) the S.I.

The user keeps moving away from or around the S.I. in slow or quick small steps (step 1012). During step 1012 user continues to maintain her stance position and awareness of the S.I. If the user is backed into a wall by the S.I., the user may step to either side while holding the blocking pad. If the S.I. is coming in with a lot of force or pressing the user into the corner or wall, then the user may release the blocking pad and flee to grab another blocking pad or create more space between the user and aggressive S.I. The same processes may be utilized when the S.I. has a weapon. However, the user may encourage all others to clear out of the area, get additional help, use the blocking pads only for self protection as necessary, and toss the blocking pad in front of the S.I. in order to hit or stab the blocking pad.

During the response to an aggressive episode, the user may speak with the S.I. only if it is determined that is likely to be helpful. This determination may have been pre-established in writing in the behavioral strategies for the plan of care for the S.I. If the user does speak with the S.I., it may be brief and have a positive intent.

During blocking, additional users or teammates may assist by scanning for additional blocking pads or objects and making the blocking pad available to the user managing the S.I., stepping in and relieving the user who is blocking, stepping in to provide additional protection to the user, calling for additional assistance, or clearing other individuals from the area if necessary. The blocking pad may also be utilized to prevent fights between S.I.s. For example, the blocking pad may be utilized to block the view of each of the S.I.s as the user protects herself. When breaking up fights, the user may assess the situation and utilize the described techniques and blocking pad to best protect the S.I.s and the user.

The blocking pad may also be utilized to prevent self-injury to the S.I. For example, the S.I. may be punching a wall or hitting his head against a window. The user may first assess what is happening. For example, the user may determine whether the S.I. is releasing intense energy or is truly trying to harm himself.

Next the user intervenes to prevent harm by placing herself with a blocking pad between the S.I. and what the S.I. wants to hit. The user may also place the blocking pad between the S.I. and the object that the S.I. is hitting. The user must be careful to ensure that the S.I. does not redirect the aggression to the user based on proximity. The user may also toss a pillow, beanbag, or blocking pad to the S.I. and direct him to hit it against the wall. In one embodiment, the blocking pad may include an extremely soft surface that the S.I. may find soothing or may find relief through throwing the blocking pad.

The blocking pads may be cleaned or sterilized after each activity to protect the user and S.I. In one embodiment, the blocking pad may include a removable cover that may be easily attached to or removed from the blocking pad. For example, an elastic band may be utilized to quickly secure the cover to the blocking pad for utilization. In one embodiment, the blocking pad may include a cavity, loop, or latch for storing or hanging the blocking pad when not in use.

The previous detailed description is of a small number of embodiments for implementing the invention and is not intended to be limiting in scope. The following claims set forth a number of the embodiments of the invention disclosed with greater particularity.

What is claimed is:

1. A blocking pad for preventing injury to a user resulting from strikes received from a special individual, comprising:
   a pad configured to receive an impact from a strike by the special individual, the pad having a plurality of opposing edges, a front surface and an opposing rear surface, wherein the front surface of the pad and the rear surface of the pad are parallel with each other and wherein the front surface and the rear surface of the pad are both a surface between the plurality of opposing edges and the front surface is configured to prevent harm to the special individual upon the special individual striking the front surface;
   a support member associated with the pad and contoured to the plurality of opposing edges of the pad, the front surface of the pad and the rear surface of the pad, wherein the support member, the front surface and the rear surface of the pad have the same area and shape;
   the support member comprises of a plurality of exterior handles positioned about a periphery of the support member and comprise a first pair of transverse handles oriented 90° relative to at least a second pair of transverse handles, wherein the first pair and the second pair of transverse handles comprise two connecting portions extending rearwardly from the support member, a transverse gripping portion between the two connecting portions; and
   wherein the plurality of exterior handles extend sufficiently rearward away from the rear surface of the pad providing separation between the rear surface and the transverse gripping portion to enable the user to quickly grab and block strikes from the special individual, and wherein the plurality of exterior handles and the pad are configured for the user to obscure themselves behind the pad before receiving the one or more strikes from the special individual; and
   a set of instructions on the support member wherein the instructions include guidance for the user to address situations arising from attending to the special individual.

2. The blocking pad of claim 1, wherein:
   a first one of the first pair of transverse handles is connected to the support member between the center and one of the plurality of edges; and
   a first one of the second pair of transverse handles is connected to the support member between the first pair of transverse handles.

3. The blocking pad of claim 2, further comprising:
   a second one of the first pair of transverse handles is connected to the support member between the center and an opposite one of plurality of edges; and
   a second one of the second pair of transverse handles is connected to the support member between the first pair of transverse handles.

4. The blocking pad of claim 2, wherein the transverse gripping portion of the plurality of exterior handles is parallel to at least one the edges of the pad.

5. The blocking pad of claim 1, further comprising:
   an exterior cover comprising a fur, faux fur, burlap, velvet, or silk material to appeal to sensory issues of the special individual.

6. The blocking pad of claim 1, wherein the set of instructions are printed, written, or attached to the blocking pad allowing for occasional updates or replacements.

7. The blocking pad of claim 1, further comprising:
   a pocket for an electronic device or a display on the support member for playing soothing music.

8. The blocking pad of claim 1, further comprising:
   a pocket for an electronic device or a display on the support member for giving instructions to the user or the special individual or providing other feedback.

9. The blocking pad of claim 1, further comprising:
   one or more straps, hook and loop fastener or other attachment point of mechanisms for storing or hanging the blocking pad.

10. A blocking pad for preventing injury to a user because of aggression from a special individual with disabilities, emotional or behavioral challenges, comprising:
   a pad configured to receive an impact from a strike by the special individual, the pad having a plurality of opposing edges comprising at least two pairs of parallel edges, the pad having a front surface and an opposing rear surface and an exterior cover, wherein the front surface of the pad and the rear surface of the pad are parallel with each other and wherein the front surface and the rear surface of the pad are both a flat surface disposed between the plurality of opposing edges and the front surface configured to prevent harm to the special individual upon the special individual striking the front surface and the rear surface configured to prevent harm to the user holding the pad as a result of strikes from the special individual knocking the rear surface of the pad into the user holding the pad;
   a support member associated with the pad and contoured to the plurality of opposing edges of the pad, the front surface of the pad and the rear surface of the pad, wherein the support member, the front surface and the rear surface of the pad have the same area and shape;
   a plurality of exterior handles associated with the support member, wherein the plurality of exterior handles are positioned about a periphery of the support member and comprise a first pair of rearwardly directed transverse handles oriented 90° relative to a second pair of rearwardly directed transverse handles, wherein the first pair and the second pair of rearwardly directed transverse handles comprise two connecting portions extending rearwardly from the support member, a transverse gripping portion between the two connecting portions, wherein the transverse gripping portion of the plurality of exterior handles is parallel to at least one of the edges of the pad;
   the support member of the pad comprising the plurality of exterior handles with each one of the plurality of exterior handles disposed adjacent an edge associated with the support member, wherein the plurality of exterior handles are positioned on the support member to enable the user to both hold and utilize the blocking pad in any number of positions with any number of handhold positions to quickly grab and block strikes from the special individual, and wherein the plurality of exterior handles and the pad are configured for the user to obscure themselves behind the pad before receiving one or more strikes from the special individual;

a first one of the first pair of rearwardly directed transverse handles connected to the support member between the center and one of the plurality of edges;

a first one of the second pair of rearwardly directed transverse handles is connected to the support member between the center and the first one of the first pair of rearwardly directed transverse handles;

a second one of the first pair of rearwardly directed transverse handles connected to the support member between the center and an opposite one of the plurality of edges;

a set of instructions on the rear surface of the pad, wherein the set of instructions include guidance for the user to address situations arising from attending to the special individual;

wherein the exterior cover consists of a fur, faux fur, burlap, velvet, or silk material to appeal to sensory issues of the special individual.

11. The blocking pad of claim 10, wherein the first one and the second one of the first pair of the rearwardly directed transverse handles are oriented 90° relative to at least the first one of the second pair of rearwardly directed transverse handles.

12. The blocking pad of claim 10, wherein the set of instructions printed, written, or attached to the blocking pad allowing for occasional updates or replacements.

13. The blocking pad of claim 10, further comprising:
a pocket for an electronic device or a display on the rear surface for playing soothing music.

14. The blocking pad of claim 10, further comprising:
a pocket for an electronic device or a display on the rear surface for giving instructions to the user or the special individual or providing other feedback.

15. A blocking pad for a user to block and absorb strikes from a special individual in open areas, bathrooms, closets, under tables and in any number of positions in which different handholds are immediately needed for the user to have protection from the special individual, comprising:

a pad comprised of an internal padding portion and an exterior cover, the pad having a front surface, a rear surface and a perimeter, wherein the front surface of the pad and the rear surface of the pad are parallel with each other and wherein the front surface and the rear surface of the pad are both flat between the perimeter, and the front surface is configured to prevent harm to the special individual upon the special individual striking the front surface and the rear surface is configured to prevent harm to the user holding the pad as a result of strikes from the special individual knocking the rear surface of the pad into the user;

a rigid support member comprised of a material different from the internal padding portion and the exterior cover, the rigid support member being associated with the rear surface of the pad and having a perimeter contoured to the perimeter of the pad, wherein the rigid support member, the front surface and the rear surface of the pad have the same shape;

the rigid support member of the pad comprises a plurality of exterior handles connected proximate to the perimeter of the rigid support member, wherein the plurality of exterior handles extend rearwardly from the rear surface of the pad, wherein the plurality of exterior handles comprise at least one pair of horizontal handles and at least one vertical handle;

wherein at least one of the plurality of exterior handles is connected to the rigid support member and oriented 90° to another one of the plurality of exterior handles for quick retrieval and defending against strikes from the special individual;

a set of instructions on the rear surface of the pad, wherein the set of instructions include guidance for the user to address situations arising from attending to the special individual;

one or more pockets on the rear surface of the pad for attending to the special individual.

16. The blocking pad of claim 15, wherein the set of instructions is printed, written, or attached to the blocking pad allowing for occasional updates or replacements.

17. The blocking pad of claim 15, further comprising:
an electronic device or a display on the rear surface for playing soothing music.

18. The blocking pad of claim 15, further comprising:
an electronic device or a display on the rear surface for giving instructions to the user or special individual or providing other feedback.

\* \* \* \* \*